United States Patent [19]

Silva

[11] Patent Number: 5,536,124
[45] Date of Patent: Jul. 16, 1996

[54] SEMI-LIQUID IMPERVIOUS CAPTIVE FASTENER SYSTEM

[75] Inventor: Dennis Silva, San Jose, Calif.

[73] Assignee: Norand Corporation, Cedar Rapids, Iowa

[21] Appl. No.: 326,508

[22] Filed: Oct. 20, 1994

[51] Int. Cl.⁶ .......................... F16B 19/00; F16B 27/00; F16B 33/00
[52] U.S. Cl. .................. 411/85; 411/369; 411/377; 411/533; 411/999
[58] Field of Search ...................... 411/107, 368, 411/369, 352, 353, 531, 533, 970, 999, 84, 85, 377

[56] References Cited

U.S. PATENT DOCUMENTS

| 3,561,075 | 2/1971 | Selinko | 411/999 X |
| 4,884,932 | 12/1989 | Meyer | 411/533 X |
| 4,930,959 | 6/1990 | Jagelid | 411/533 X |
| 5,118,235 | 6/1992 | Dill | 411/533 X |
| 5,171,118 | 12/1992 | Rothenbuhler | 411/531 X |

*Primary Examiner*—Neill R. Wilson
*Attorney, Agent, or Firm*—Suiter & Associates

[57] ABSTRACT

A semi-liquid impervious captive fastener system for electronic components and the like which includes a first rigid member adapted for securement to a second rigid member. The first rigid member has a well opening, a fastener well, and a fastener aperture. An elastic member is co-molded to the first rigid member such that the elastic member extends at least partially over the well opening and into the well so as to surround the fastener aperture. A threaded fastener having a head portion may reside in the well such that a driving instrument may be inserted through the elastic member for driving the threaded fastener so as to secure a first rigid member to a second rigid member and forming at least a semi-liquid impervious seal while acting to secure the threaded fastener within the well.

7 Claims, 2 Drawing Sheets

SEMI-LIQUID IMPERVIOUS CAPTIVE FASTENER SYSTEM

TECHNICAL FIELD

The present invention discloses an apparatus designed to improve recessed screw-type fastening systems. More particularly, the invention provides for the captivation of unaffixed screws, construction of a water-tight seal between the screw and socket, and greater aesthetic value.

DISCLOSURE OF THE INVENTION

Fasteners have a tendency to become lost. Additionally, when one disassembles an object through the removal of simple screws, the screws are not infrequently known to be mistakenly resecured in sockets other than those for which they were provided. The present invention provides a remedy for these problems through the use of a co-molded flexible polymeric coating bonded to the surface of the section of material to be secured by the screws.

The co-molded polymeric coating extends both over the recessed driving well and around its inner surface, ending only at the entrance to the driving socket. Access to the driving well is obtained through means of an o-shaped aperture extending through the layer of co-molded polymer. Once a screw is placed within the polymer coated driving well, it remains trapped. Additionally, the polymeric coating acts to form a protective, water-tight seal between the interface of the screw and driving well while providing an electrostatic, shock resistant and aesthetically pleasing surface for the section of material to be secured.

OBJECTS OF THE INVENTION

It is a primary object of the present invention to provide means for the captivation of loose screws in unassembled objects.

Likewise, another object of the present invention is to provide the means for captivating screws in close proximity to their respective sockets.

Another object of the present invention is to provide structure allowing alignment of screws with their respective sockets in a fashion where no additional outside support is necessary.

Still another object of the present invention is to provide a compressible surface to the base of the driving well allowing for the formation of a water tight protective seal between the base of the well and the fastened screw.

Yet another object of the present invention is to provide for an electrostatic, shock resistant covering to the fastened area.

Yet still another object of the present invention is to provide for greater aesthetic value in the exterior surface of materials to be joined.

Other objects, advantages and novel features of the present invention will become apparent from the following detailed description of the invention, when considered in conjunction with the drawings

DETAILED DESCRIPTION

Figure 1:
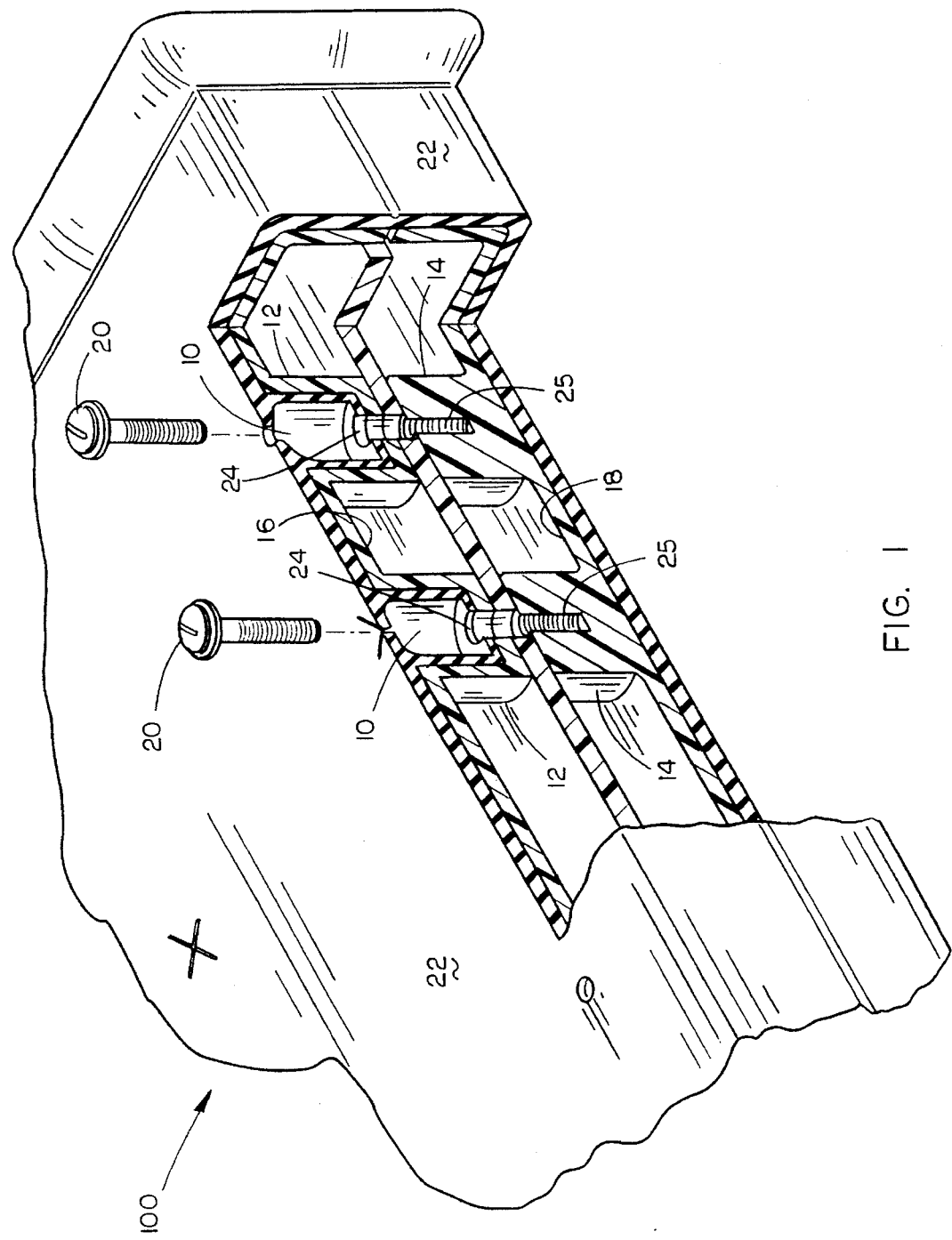
FIG. 1 is a perspective partial sectional view of a handheld electronic device having a housing consisting of two clam type shell portions secured together at least partially by threaded fasteners according to an exemplary embodiment of the present invention.
Figure 2:
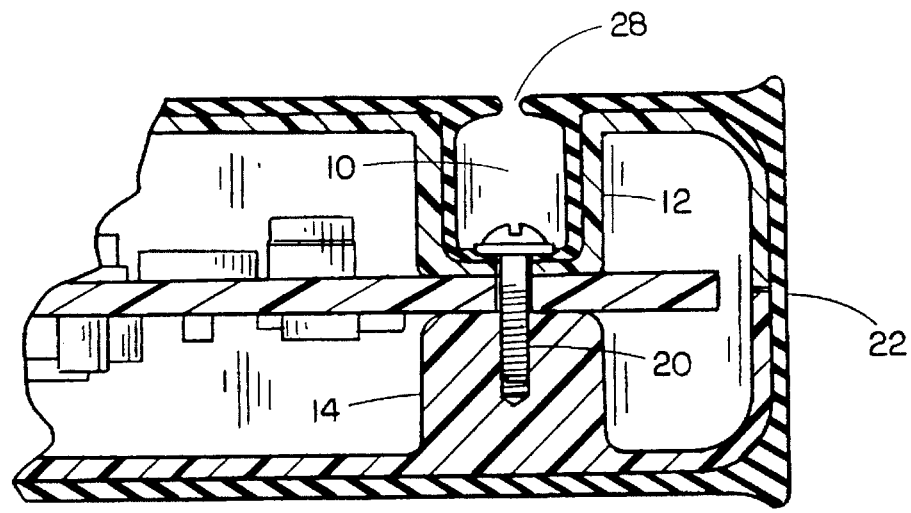
FIG. 2 is a full sectional elevational view of a circuit board encompassed between two sections of materials to be joined through the use of co-polymer coated screw fastening systems wherein the threaded fastener has formed a seal via the copolymer.
Figure 3:
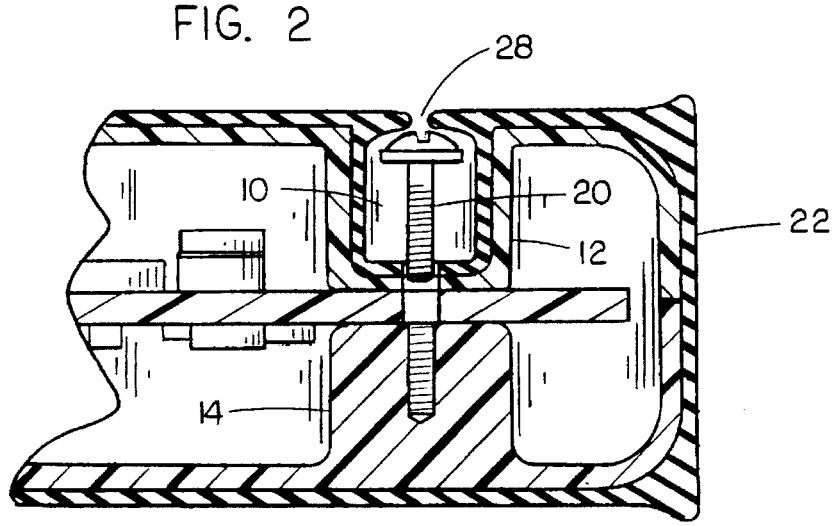
FIG. 3 is a sectional view of a co-polymer coated driving well with a screw fully un-secured yet maintained captive within the fastener well.
Figure 4:
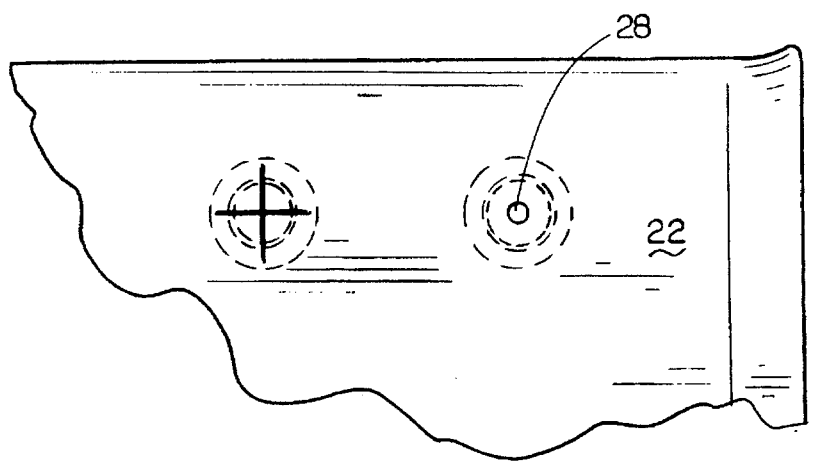
FIG. 4 is a top plan view illustrating both o-shaped and x-shaped fastener wells with hidden lines.

The present invention (100) is generally related to an apparatus designed as an improvement for screw fastening systems of a type consisting of dual columnar support structures (12)(14) affixed to the insides of two plates of material to be joined (16)(18). The outer plate (16) of material to be affixed contains recessed driving wells (10) into which a screw (20) may be fitted. The present invention (100) utilizes a layer of co-molded polymer (22) covering the entire exterior surface of the exterior plate (12) of material containing the driving wells (12). The layer of co-molded polymer (22) covers the top of the well (10), while additionally extending into and around the interior surface of the well, ending only at the edge (24) of the entrance to the socket. Access to the well (10) and socket (25) is obtained through means of an o-shaped aperture (28) (or the like) extending through the co-molded polymer (22) in a position central to the well(10) and directly above the screw socket (26). The aperture (28) may be x-shaped or the like as shown in FIGS. 1 and 4. Further, the aperture (28) may be the embodiment of various combinations of shapes derived from the linear features of the x-shape or the curved features of the o-shape or any combination thereof or the like such as a *-shaped aperture or a ✧-shaped aperture, for example.

Upon the insertion of a screw (20)into the well (10) through the aperture (24) in the layer of co-polymer (22), the screw (20) will become completely encompassed and captivated within the confines of well (10). Insertion of the screw (20) into the socket (26) may be accomplished by inserting a screwdriver through the aperture (28) in the co-polymer (22) and into the screw head interface (30). Once the screw (20) has been driven into the socket (26), the co-polymer (22) at the base of the well forms a seal with the underside of the head of the screw, thus, providing for a water-tight protective seal. When a screw (20) is later removed from a socket, it will remain within the confines of the well (10), enabling one to reassemble the structure with greater speed and efficiency.

Additionally, the layer of co-polymer (22) acts as a shock resistant, waterproof and electrostatic mat covering the outside surface of the objects to be joined. Said co-polymer (22) also provides for a greater aesthetic value of the object to be assembled in that it covers unsightly driving wells (10) and screws (20), thus, providing a surface uniform in appearance.

Accordingly, it will be appreciated that the preferred embodiment shown herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. A semi-liquid impervious captive fastener system for electronic components and the like, comprising:

(a) a first rigid member adapted for securement to a second rigid member, said first rigid member having a well opening, a fastener well, and a fastener aperture;

(b) an elastic member co-molded to said first rigid member such that said elastic member extends at least partially over said well opening and into said well so as to surround said fastener aperture; and (c) a threaded fastener having a head portion generally with a diameter approximating the diameter of said fastener well and larger than said fastener aperture and residing in said fastener well such that a driving instrument may be inserted through said at least partial elastic member covering of said fastener well for driving said threaded fastener so as to secure said first rigid member to said second rigid member and forming at least a semi-liquid impervious seal between said fastener head and said first rigid member around said fastener aperture via said elastic member surrounding said fastener aperture whereby said threaded fastener is held captive within said fastener well.

2. The semi-liquid impervious captive fastener system for electronic components of claim 1, wherein said elastic member extending over said well opening forms a generally o-shaped aperature.

3. The semi-liquid impervious captive fastener system for electronic components of claim 1, wherein said elastic member extending over said well opening forms a generally x-shaped aperature.

4. The semi-liquid impervious captive fastener system for electronic components of claim 1, wherein said elastic member extending over said well opening forms a generally ✳-shaped aperature.

5. The semi-liquid impervious captive fastener system for electronic components of claim 1, wherein said elastic member extending over said well opening forms a generally ✵-shaped aperature.

6. The semi-liquid impervious captive fastener for electronic components of claim 1, wherein said elastic member extending over at least partially said well opening and into said well extends at least partially onto the walls of the fastener well.

7. A semi-liquid impervious captive fastener system for electronic components and the like, comprising:

(a) a first rigid member adapted for securement to a second rigid member, said first rigid member having a well opening, a fastener well, and a fastener aperture;

(b) an elastic member co-molded to said first rigid member such that said elastic member extends at least partially over said well opening and into said well so as to surround said fastener aperture; and (c) a threaded fastener having a head portion generally with a diameter approximating the diameter of said fastener well and larger than said fastener aperture and residing in said fastener well such that a driving instrument may be inserted through said at least partial elastic member covering of said fastener well for driving said threaded fastener so as to secure said first rigid member to said second rigid member and forming at least a semi-liquid impervious seal between said fastener head and said first rigid member around said fastener aperture via said elastic member surrounding said fastener aperture whereby said threaded fastener is held captive within said fastener well;

(d) wherein said elastic member extending over said well opening forms a generally x-shaped structure.

* * * * *